(12) United States Patent
Pins (10) Patent No.: US 7,644,368 B2
(45) Date of Patent: Jan. 5, 2010

(54) SYSTEM AND METHOD FOR REGRESSION TESTS OF USER INTERFACES

(75) Inventor: Markus Pins, Karlsruhe (DE)

(73) Assignee: SAP AG, Walldorf (DE)

( * ) Notice: Subject to any disclaimer, the term of this patent is extended or adjusted under 35 U.S.C. 154(b) by 499 days.

(21) Appl. No.: 11/171,973

(22) Filed: Jun. 29, 2005

(65) Prior Publication Data

US 2007/0006043 A1    Jan. 4, 2007

(51) Int. Cl.
*G06F 11/00*    (2006.01)
(52) U.S. Cl. .................. 715/762; 702/182; 702/193; 702/194; 702/68; 714/38
(58) Field of Classification Search .................. 714/38; 702/68, 182, 193, 194; 715/762
See application file for complete search history.

(56) References Cited

U.S. PATENT DOCUMENTS 6,854,089 B1 * 2/2005 Santee et al. ................ 715/783
2003/0191590 A1 * 10/2003 Narayan et al. ................ 702/68
2003/0202012 A1 * 10/2003 Kemp .......................... 345/762
2003/0236775 A1 * 12/2003 Patterson ........................ 707/3
2004/0001092 A1 * 1/2004 Rothwein et al. ............ 345/763
2006/0080618 A1 * 4/2006 Kracht ......................... 715/780
2006/0110045 A1 * 5/2006 Reissman .................... 382/203

* cited by examiner

*Primary Examiner*—William L Bashore
*Assistant Examiner*—Daeho D Song
(74) *Attorney, Agent, or Firm*—Blakely, Sokoloff, Taylor & Zafman LLP (57) ABSTRACT

Embodiments of the invention are generally directed to a system and method for regression tests of graphical user interfaces. In one embodiment, a testing system receives the actual state and the target of a GUI under test. The testing system computes the difference between the actual state and the target state based, at least in part, on a weighting function. The computed difference is compared to a threshold value. In an embodiment, if the difference is within the threshold, then the system indicates that the GUI is valid.

19 Claims, 6 Drawing Sheets

SYSTEM AND METHOD FOR REGRESSION TESTS OF USER INTERFACES

TECHNICAL FIELD

Embodiments of the invention generally relate to the field of user interfaces and, more particularly, to a system and method for regression tests of user interfaces.

BACKGROUND

Figure 1:
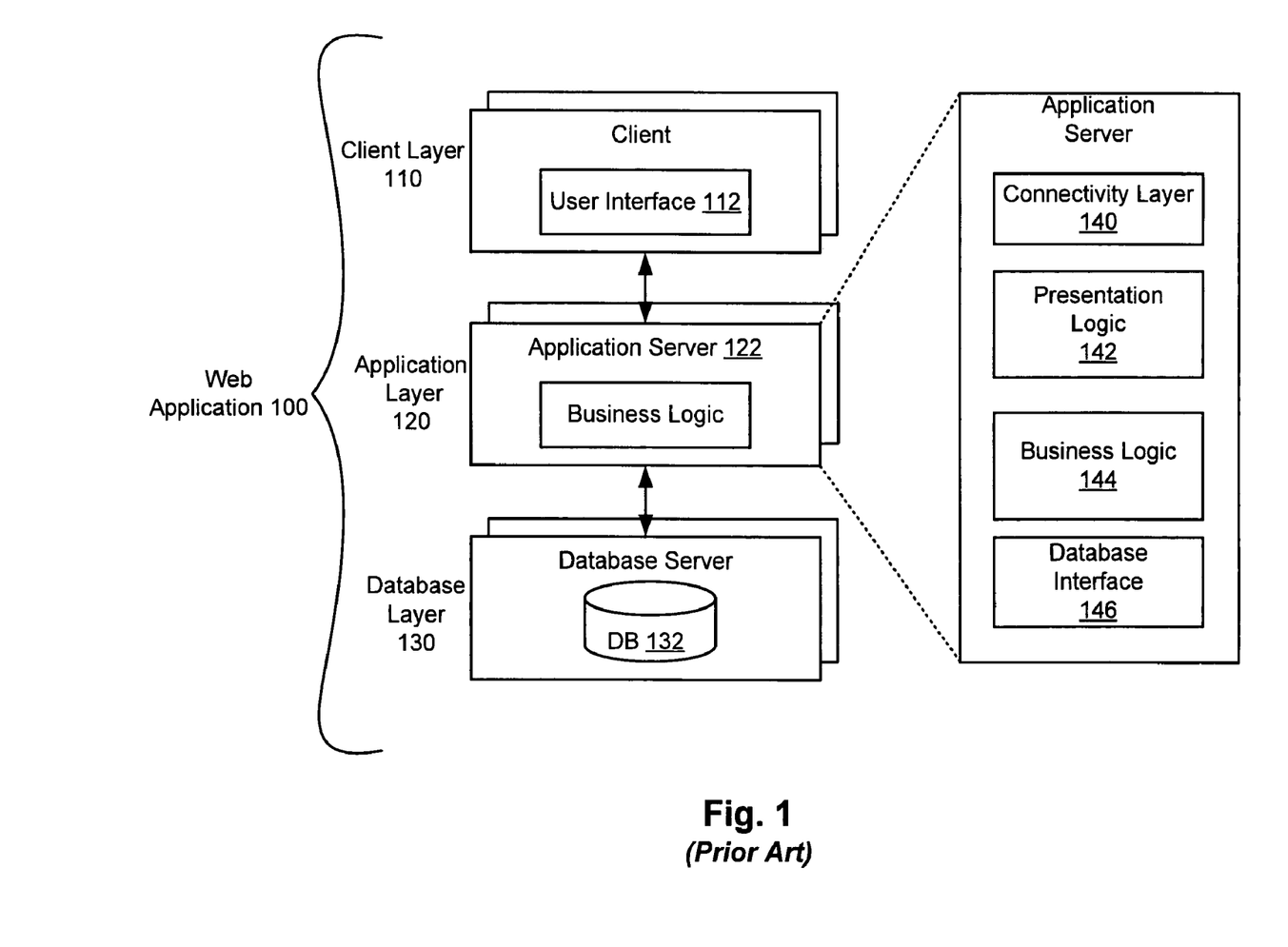
FIG. 1 is a block diagram of a Web application having a multi-tiered architecture.

Many businesses are providing access to their products and services through applications that are delivered over computer networks such as the Internet. These applications typically have a multi-tiered architecture. In those cases where the applications are delivered over the Internet they are commonly referred to as Web applications. FIG. 1 is a block diagram of a Web application 100 having a multi-tiered architecture.

Web application 100 includes client layer 110, application layer 120, and database layer 130. Client layer 110 includes user interface 112 that runs on a client computing device such as a desktop computer, a laptop computer, a personal digital assistant, a telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP). The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). Presentation logic 142 generates a Graphical User Interface (GUI) using, for example, a markup language such as the Hyper Text Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Web application 100 provides one example of the widespread use and importance of graphical user interfaces (GUIs) in modern computer software. GUIs are, in fact, a nearly ubiquitous means for a user to interact with software. Typically, the user provides events such pointing device movements, object manipulation, menu selection, and the opening and closing of windows. In response, the GUI interacts with the underlying software through messages and/or method calls. The complexity of GUIs has been increasing as the use of GUIs has increased.

The testing of GUIs, however, has not kept pace with the growth in the use and complexity of GUIs. The testing of a GUI typically involves comparing the actual state of the GUI to a target state for the GUI. Conventional GUI testing systems often perform a bitwise comparison between the actual state of the GUI and the target state of the GUI. If the actual state is exactly the same as the target state, then the system can determine that the GUI is valid. Otherwise, a human must decide whether small differences between the actual state and the target state should be allowed.

In practice, there can be many valid reasons for a relatively small difference between the actual state of the GUI and its target state. For example, many GUIs display information that is constantly changing such as times, dates, market valuations, displacement of moving objects, counts, and the like. In addition, variations in the placement and color of objects are often acceptable. The costs associated with testing a GUI increase dramatically when a human is required to make decisions on a case-by-case basis. In addition, the use of human labor to test the validity of GUIs also introduces human error into the testing process.

SUMMARY OF THE INVENTION

Embodiments of the invention are generally directed to a system and method for regression tests of graphical user interfaces. In one embodiment, a testing system receives the actual state and the target of a GUI under test. The testing system computes the difference between the actual state and the target state based, at least in part, on a weighting function. The computed difference is compared to a threshold value. In an embodiment, if the difference is within the threshold, then the system indicates that the GUI is valid.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for regression tests of graphical user interfaces. In one embodiment, a testing system receives the actual state and the target of a graphical user interface (GUI) under test. As is further described below, the testing system computes the difference between the actual state and the target state based, at least in part, on a weighting function. The computed difference is compared to a threshold value. In an embodiment, if the difference is within the threshold, then the system indicates that the GUI is valid.

Figure 2:
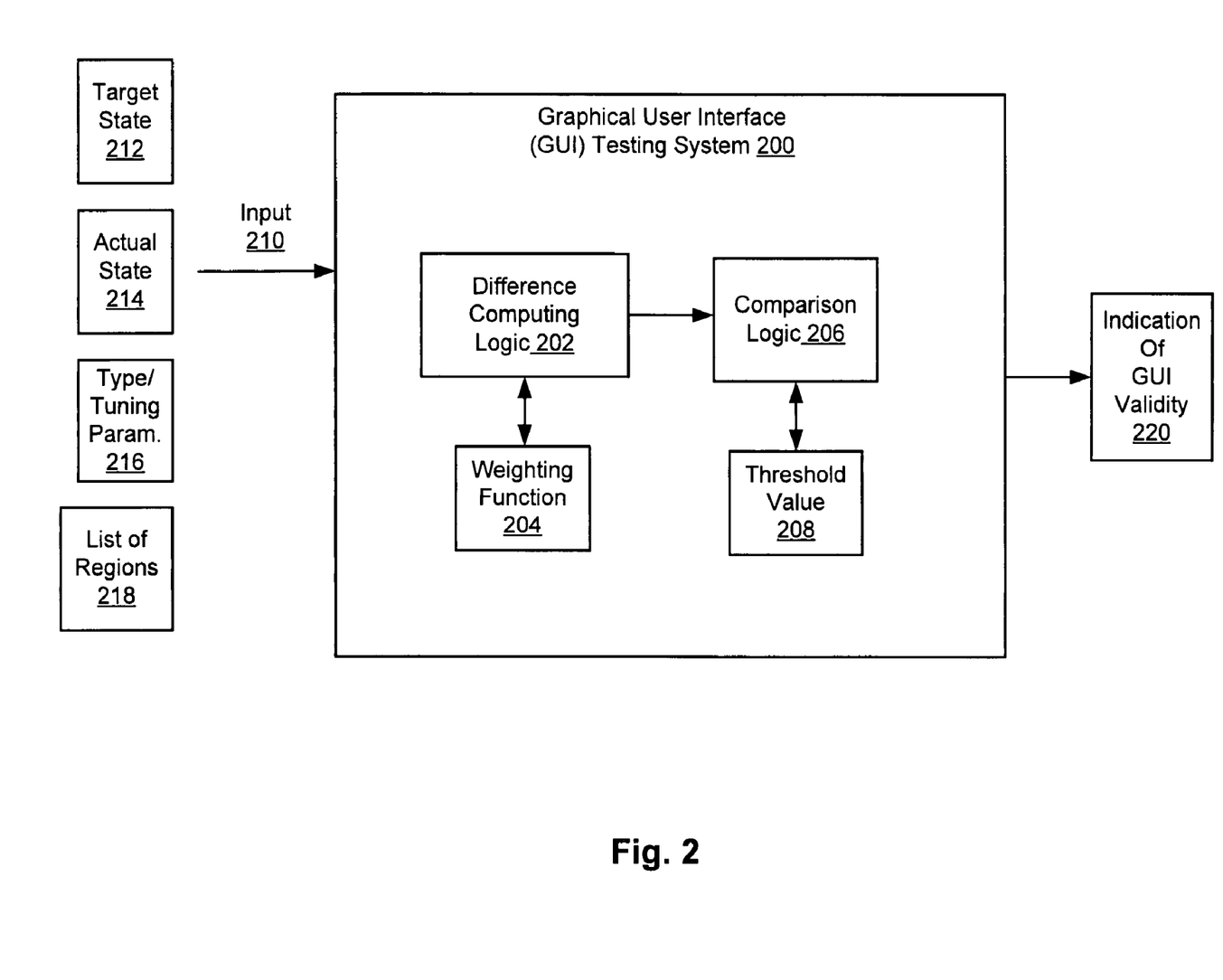
FIG. 2 is a block diagram of selected elements of a GUI testing system, implemented according to an embodiment of the invention.

FIG. 2 is a block diagram of selected elements of GUI testing system 200, implemented according to an embodiment of the invention. GUI testing system 200 may be part of a multi-tiered network. The multi-tiered network may be implemented using a variety of different application technologies at each of the layers of the multi-tier architecture, including those based on the Java 2 Enterprise Edition™ ("J2EE") platform, the Microsoft.NET platform, the Websphere platform developed by IBM Corporation, and/or the Advanced Business Application Programming ("ABAP") platform developed by SAP AG. In an embodiment, GUI testing system 200 includes difference computing logic 202, weighting function 204, comparison logic 206, and threshold value 208. GUI testing system 200 may be used to perform regression testing on a GUI. A regression test involves retesting a GUI after it has been modified according to a regression testing strategy. In an embodiment, substantial parts of the testing process are automated.

In one embodiment, GUI testing system 200 receives one or more inputs as shown by 210. The inputs received by GUI testing system 200 may include target state 212 and/or actual state 214. A GUI includes a set of objects (e.g., displayed graphically) and a set of properties associated with the objects (e.g., how an object responds when selected with a pointing device). The state of a GUI specifies which objects are part of the GUI and how those objects are displayed to a user. The term "actual state" refers to how the GUI actually appears to a user. The term "target state" refers to a valid state for a GUI as determined by, for example, a developer.

In an embodiment, GUI testing system 200 can be configured to have different requirements for different types of GUIs. For example, a GUI for a first display may be permitted to have a lower resolution than a GUI for a second display. Similarly, in certain cases the colors displayed by a GUI should conform closely to a target color (e.g., when displaying a trademark) but, in other cases, the displayed color may be less important. In an embodiment, type/tuning parameter input 216 allows a user to specify a type for a GUI (e.g., low resolution, black and white display, etc.) and/or to specify one or more tuning parameters. The tuning parameters can include any of a wide range of parameters for determining the state of a GUI including a color parameter, a placement parameter, a new object parameter, a time/date parameter, and/or a status indicator parameter.

In one embodiment, GUI testing system 200 can be configured to blind-out specified regions and/or objects of a GUI. The term "blinding-out" refers to removing the specified regions and/or objects from consideration during a test. In an embodiment, list of regions 218 allows a user to specify one or more regions (and/or objects) of a GUI to be blinded-out during a test of the GUI.

Difference computing logic 202 receives one or more of inputs 212-218 and determines the difference between the actual state of a GUI (e.g., actual state 214) and the target state for the GUI (e.g., target state 212). In an embodiment, the difference is computed based, at least in part, on weighting function 204. A "weighting function" refers to a function that allows for the parameters of the function to be assigned a weight to establish the relative importance of the parameter. Examples of the parameters used by weighting function 204 include any of the tuning parameters shown above. In one embodiment, the output of difference computing logic 202 is a scalar value (for ease of reference, a difference value) that indicates the difference between actual state 214 and target state 212. In one embodiment, the difference value is between zero and one wherein the value zero indicates substantially no similarity between actual state 214 and target state 212 and the value one indicates that they are substantially the same.

In an alternative embodiment, difference computing logic 202 can return not only a scalar (e.g., from zero to one) but a vector of values, for example, indicating similarities in key performance indicators (KPIs). The KPIs can include a wide range of indicators including color, contrast, orientation and the like. In such an embodiment, weighting function 204 can, based on the vector of values, generate a scalar difference value (e.g., from zero to one). In an embodiment, a number of systems can be used to process the vector of values including human intelligence, rule-based systems, and/or neural networks.

Comparison logic 206 receives the difference value from difference computing logic 202. In one embodiment, comparison logic 206 compares the difference value to threshold value 208. If the difference value exceeds threshold value 208, then actual state 214 may be deemed to be invalid. In an embodiment, threshold value 208 is a range values over which actual state 214 may be deemed to be valid (or, conversely deemed to be invalid). GUI testing system 200 provides indication of GUI validity 220. Indication of GUI validity 220 may be a discrete value that specifies whether actual state 214 is valid or it may provide an indication of how likely it is that actual state 214 is valid. GUI testing system 200 is further described below with reference to FIGS. 3-5.

Figure 3:
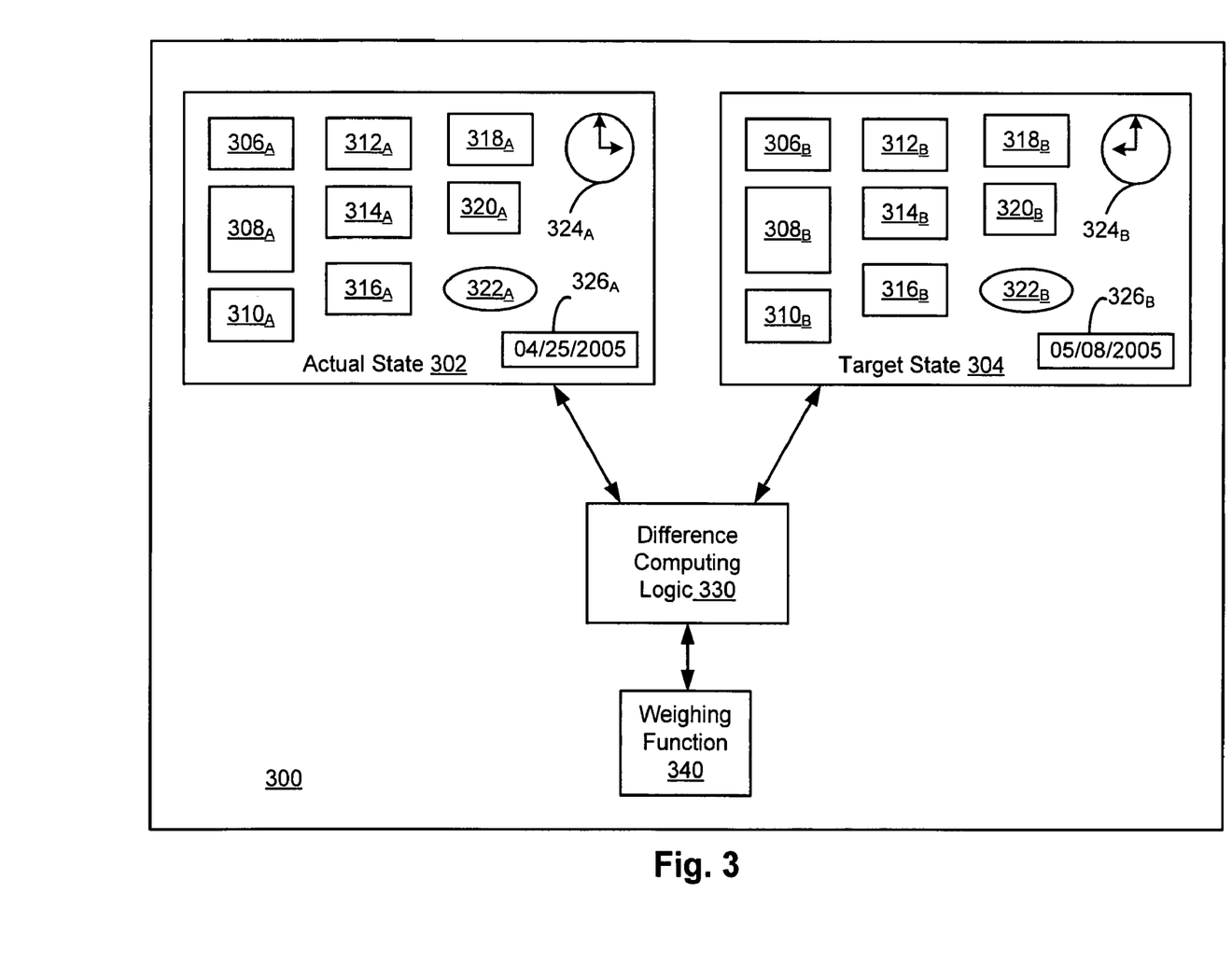
FIG. 3 is a block diagram illustrating selected aspects of a GUI testing system, according to an embodiment of the invention.

FIG. 3 is a block diagram illustrating selected aspects of GUI testing system 300, according to an embodiment of the invention. GUI testing system 300 includes the actual state 302 of a GUI under test and the target state 304 for the GUI. Actual state 302 and target state 304 include objects 306-326. Objects 306-326 may be windows and/or controls. A window (e.g., window 306) refers to an enclosed portion of a GUI used to display information or to run a program. A control refers to an object that allows a user to control a GUI. Examples of a control include tree view 308, spin 310, edit box 312, list box 314, check box 316, radio button 318, tab control 320, button 322, time indicator 324, and date indicator 326.

Difference computing logic 330 computes a value that indicates how different actual state 302 is from target state 304. The computation may include comparing objects $306_A$-$326_A$ with objects $306_B$-$326_B$. In an embodiment, difference computing logic 330 employs weighting function 340 to compute the difference between objects $306_A$-$326_A$ with objects $306_B$-$326_B$. Weighting function 340 uses one or more parameters to assign a relative weight to a feature (or features) of actual state 302. For example, differences between time indicator $324_A$ and $324_B$ may have a low relative weight because actual state 302 can be valid even if there is a difference between $324_A$ and $324_B$. Similarly, date indicator $326_A$ and $326_B$ may also have a low relative weight to allow for differences in the rendered date. It is to be appreciated that a wide range of weights may be assigned to nearly any feature of a GUI under test in an embodiment of the invention.

Figure 4:
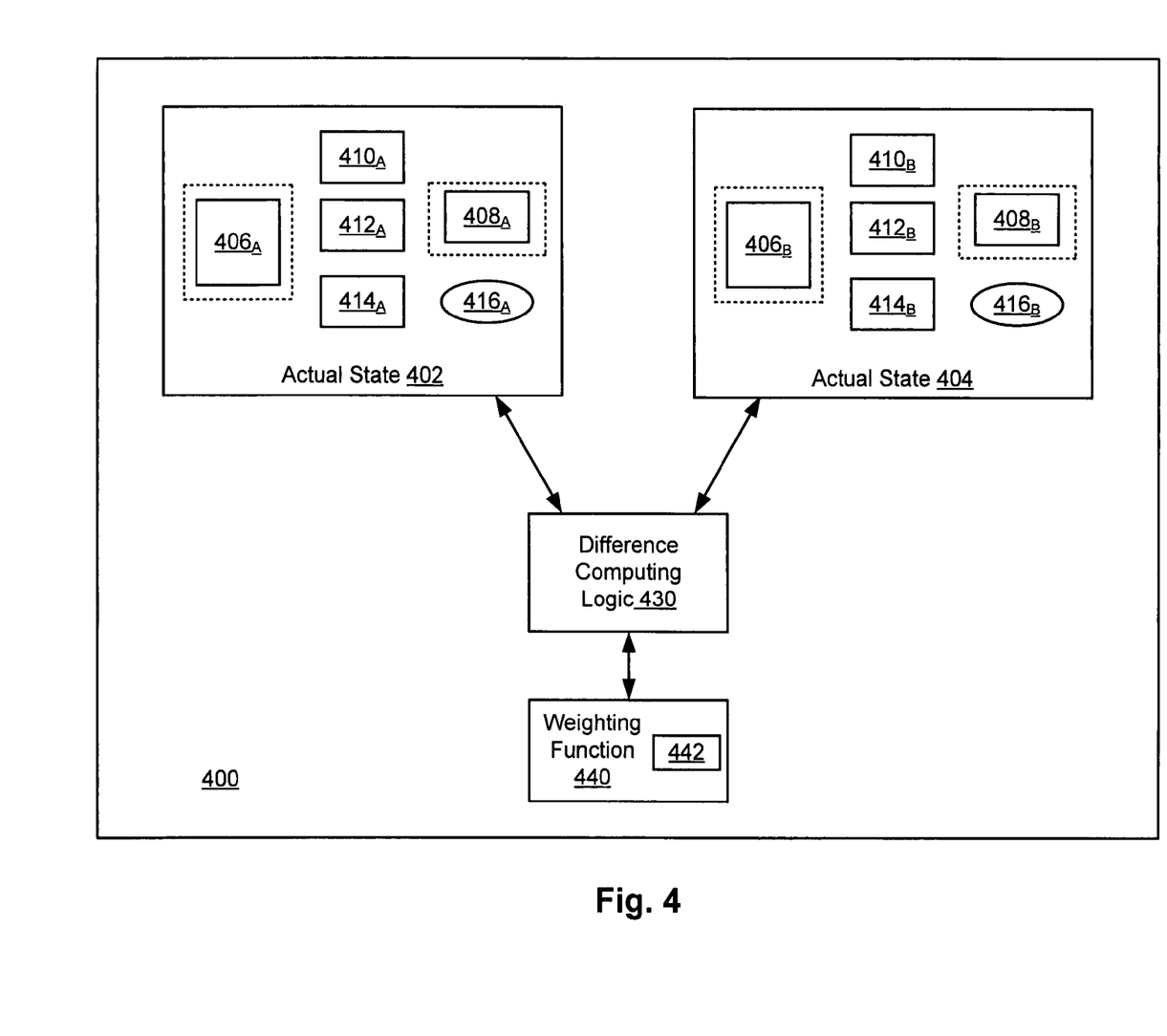
FIG. 4 is a block diagram of selected aspects of a GUI testing system implemented to blind-out selected regions of a GUI under test, according to an embodiment of the invention.

FIG. 4 is a block diagram of selected aspects of GUI testing system 400 implemented to blind-out selected regions of a GUI under test, according to an embodiment of the invention. GUI testing system 400 includes the actual state 402 of a GUI under test and the target state 404 for the GUI. In addition, GUI testing system 400 includes difference computing logic 430 and weighting function 440.

In an embodiment, weighting function 440 can be configured to blind-out specified regions (or objects) of a GUI under test. For example, objects 406-408 are blinded-out as shown by the dotted lines surrounding objects 406-408. In such an embodiment, the regions (or objects) that are blinded-out are ignored by difference computing logic 430 when determining the difference between actual state 402 and target state 404. The remaining objects, however, (e.g., objects 410-416) are considered when computing a difference between actual state 402 and target state 404.

A user can provide input (e.g., data 442) to specify which regions (or objects) to blind out. The input may be a set of coordinates (e.g., rectangular, polar, etc.) defining a region or any other identifier that specifies a region (and/or object) to exclude from the difference computation. The input may be provided as a file (either locally or remotely) or may be provided through a tool provided by GUI testing system 400.

Figure 5:
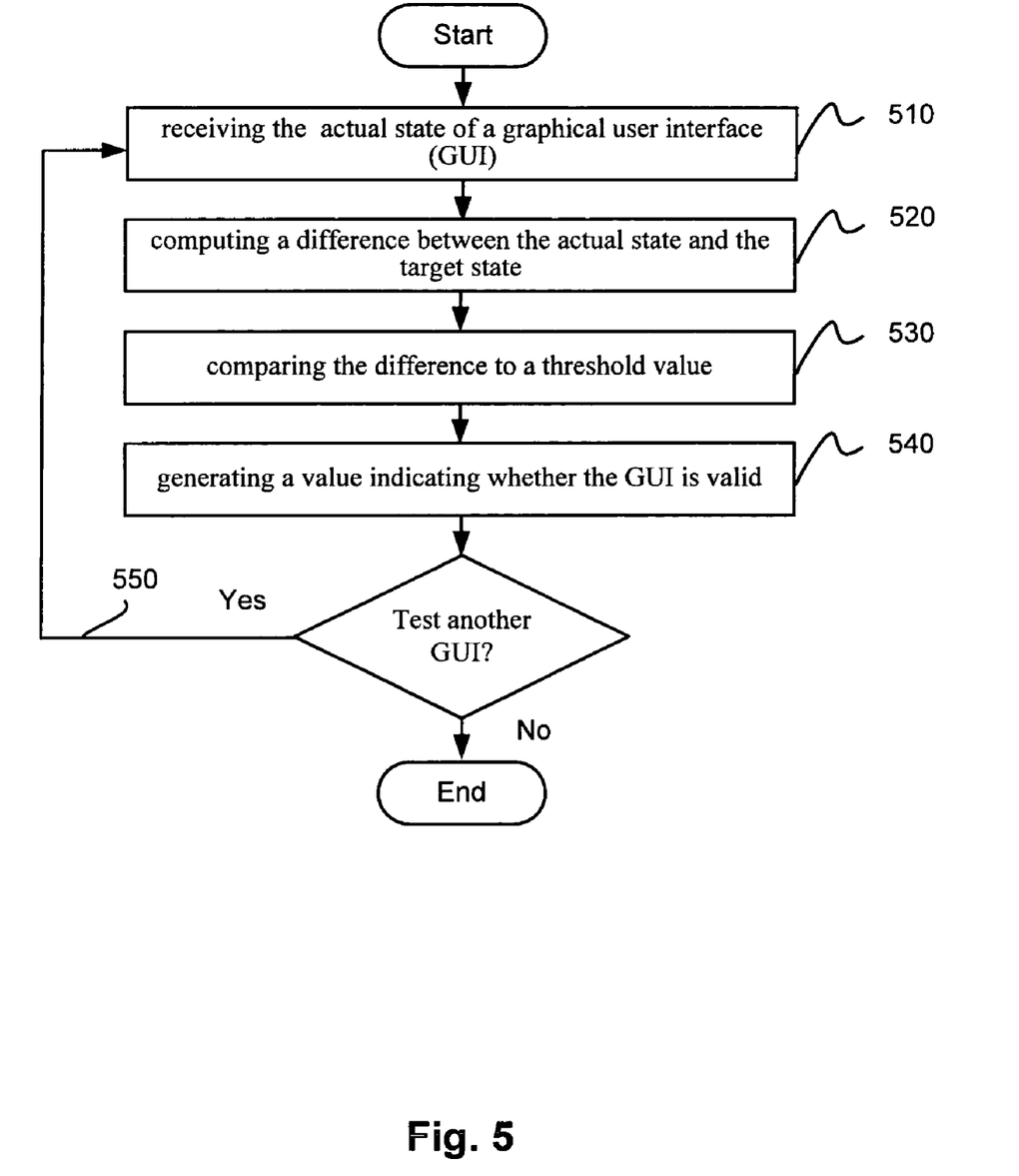
FIG. 5 is a flow diagram illustrating certain aspects of a method for testing a graphical user interface, according to an embodiment of the invention.

Turning now to FIG. 5, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 5 is a flow diagram illustrating certain aspects of a method for testing a graphical user interface, according to an embodiment of the invention. Referring to process block 510, a GUI testing system (e.g., GUI testing 200, shown in FIG. 2) receives an indication of the actual state of a graphical user interface. The phrase "receiving an indication" refers to receiving an input that provides the actual state of the GUI, identifies the actual state of the GUI so that it can be accessed, or specifies a location from which the actual state can be accessed. In one embodiment, "receiving the indication" includes receiving a raster image file containing the actual state of the GUI.

The GUI testing system may also receive additional inputs, in an embodiment of the invention. For example, the GUI testing system may receive an indication of the target state for the GUI under test. This received indication might be a file (e.g., a raster image file) that contains the target state or it might simply be an identifier that specifies a file stored in memory that contains the target state for the GUI. In addition, a user (or another system) may provide type information and/or tuning parameters to set the parameters of a weighting function (or to specify a particular weighting function).

A user may also provide information to specify one or more regions (or objects) to be blinded-out during a test. This information can include any identifier that species a region (or object) of the GUI. In one embodiment, this information is a set of coordinates (e.g., rectangular, polar, etc.) that specifies the location of a region (or object) to be blinded-out.

Referring to process block 520, difference computing logic (e.g., difference computing logic 202, shown in FIG. 2) computes a difference between at least a portion of the actual state and the target state of the GUI under test. In an embodiment, the computed difference is based, at least in part on a weighting function (e.g., weighting function 204, shown in FIG. 2).

The weighting function may take into account a number of parameters to determine the difference between the actual state and the target state. Examples of the parameters used by the weighting function include a color parameter, a placement parameter, a new object parameter, a time/date parameter, and/or a status indicator parameter.

The difference value computed at 520 is compared with a threshold value at 530 to determine the validity of the actual state of the GUI under test. In one embodiment, the comparison involves determining whether the difference value exceeds a threshold value. In an alternative embodiment, the comparison involves determining whether the difference value falls within a range of threshold values.

Referring to process block 540, the GUI testing system generates a value (e.g., a validity indicator) that indicates whether the GUI under test is valid. In one embodiment, the validity indicator is based, at least in part, on whether the difference value exceeds the threshold value. The validity indicator may be any kind of indication that specifies whether the tested GUI is valid. For example, the validity indicator may be a number (e.g., a one or a zero) or a text string (e.g., "valid" or "invalid"). In addition, the validity indicator may be, for example, a visual display (red/green light), an audio signal, and/or an instruction for the GUI testing system to take another action (e.g., test another GUI). The process of testing at least a portion of a GUI may be repeated at 550.

It is to be appreciated that embodiments of the invention are not limited to any particular operating system, server or type of front-end because the comparison is based on the input of files (e.g., raster files) that can be created on (almost) any computing system. Rather, the architectures and methodologies discussed above may be implemented with various types of computing systems. One possible architecture is an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, compact disks-read only memory (CD-ROMs), digital versatile/video disks (DYD ROMs), erasable programmable read-only memory (EPROMs), electrically erasable programmable read-only memory (EEPROMs), magnetic or optical cards or other type of computer-readable media suitable for storing electronic instructions.

Figure 6:
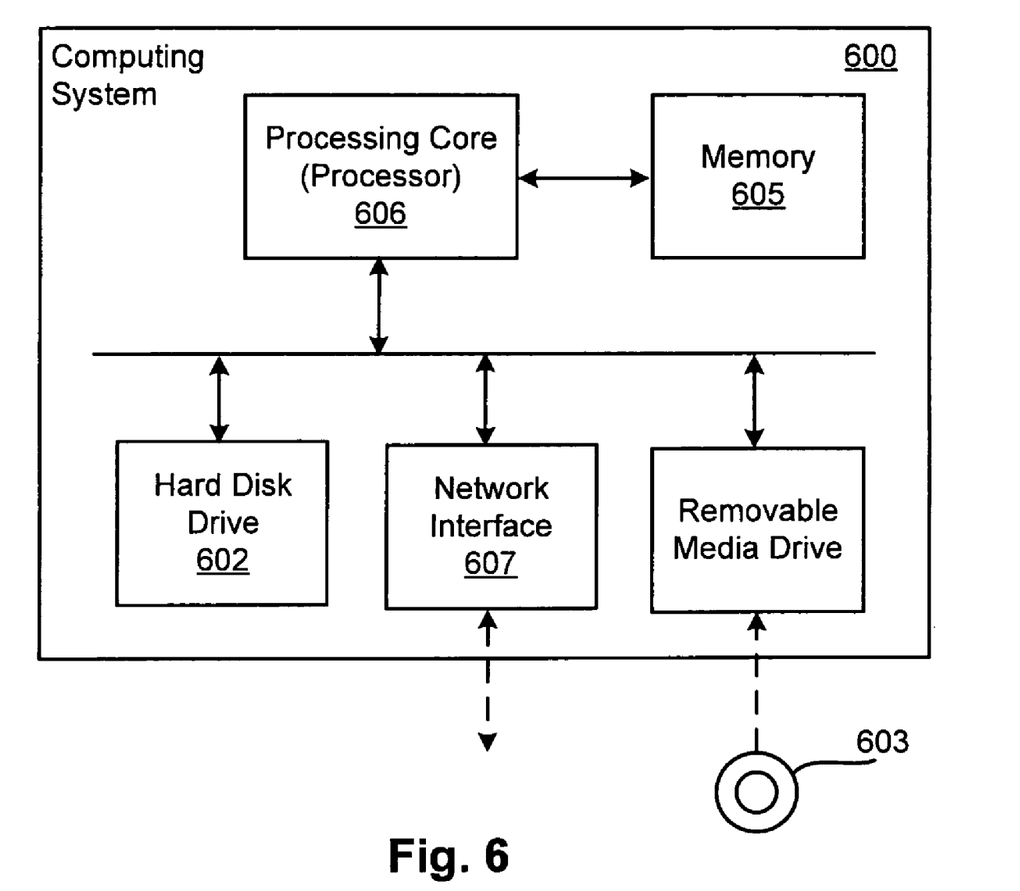
FIG. 6 is a block diagram of a computing system that can execute program code stored by an article of manufacture.

FIG. 6 is a block diagram of a computing system 600 that can execute program code stored by an article of manufacture. It is important to recognize that the computing system block diagram of FIG. 6 is just one of various computing system architectures. The applicable article of manufacture may include one or more fixed components (such as a hard disk drive 602 or memory 605) and/or various movable components such as a CD ROM 603, a compact disc, a magnetic tape, etc. In order to execute the program code, typically instructions of the program code are loaded into the Random Access Memory (RAM) 605; and, the processing core 606 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 606.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

Elements of embodiments of the present invention may also be provided as a computer-readable medium for storing computer-readable instructions. The computer-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of computer-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for testing a graphical user interface comprising:
   receiving a first image file containing data representing an actual state of at least a portion of the graphical user interface, the actual state including an actual visual appearance of the graphical user interface as it appears when the graphical user interface is displayed on a computer display;
   receiving a second image file containing data representing a valid state that is intended for the portion of the graphical user interface, the valid state including a valid visual appearance for the portion of the graphical user interface;
   computing a difference between the first image file containing data representing the actual state of the graphical user interface and the second image file containing data representing the valid state intended for the portion of the graphical user interface based, at least in part, on a weighting function, the weighting function providing weights for parameters of the graphical user interface based on a relative importance of each parameter, wherein computing the difference between the first image file and the second image file includes removing one or more regions of the graphical user interface from consideration through use of the weighting function;
   comparing the difference between the first image file and the second image file to a threshold value; and
   determining whether the graphical user interface is valid based, at least in part, on whether the difference between the first image file and the second image file exceeds the threshold value.

2. The method of claim 1, wherein the first image file and the second image file are raster image files.

3. The method of claim 1, wherein removing one or more regions of the graphical user interface from consideration in the computation of the difference between the first image file and the second image file through use of the weighting function is based, at least in part, on user input.

4. The method of claim 3, further comprising:
   receiving a list of one or more regions of the graphical user interface to be removed from consideration through use of the weighting function.

5. The method of claim 4, wherein receiving the list of one or more regions of the graphical user interface to be removed from consideration comprises receiving, for each region, at least one of:
   a set of rectangular grid coordinates to specify the location of the region within the graphical user interface; and
   a set of non-rectangular grid coordinates to specify the location of the region within the graphical user interface.

6. The method of claim 1, further comprising:
   receiving an input specifying a type for the graphical user interface; and
   altering a parameter of the weighting function based, at least in part, on the type.

7. The method of claim 6, wherein altering the parameter of the weighting function for the computation of the difference between the first image file and the second image file based, at least in part, on the type for the graphical user interface comprises altering at least one of:
   a color parameter;
   a placement parameter;
   a new object parameter;
   a time/date parameter; and
   a status indicator parameter.

8. The method of claim 1, wherein determining whether the graphical user interface is valid comprises:
   generating a vector of values indicating similarities in performance indicators for the actual state and the valid state.

9. The method of claim 8, wherein the vector of values includes one or more of a color value, a contrast value, or an orientation value.

10. An apparatus comprising:
- a display for a graphical user interface;
- a memory to hold a valid image file containing data representing a valid state of at least a portion of the graphical user interface, the valid state including a valid visual appearance intended for the portion of the graphical user interface;
- a development environment to test the graphical user interface, testing of the graphical user interface including obtaining an actual image file containing data representing an actual state of the portion of the graphical user interface, the actual state including an actual visual appearance of the graphical user interface as it appears when the graphical user interface is displayed to a user; and
- a processor and logic executable thereon, the logic including a difference computing logic and a comparison logic, the logic to:
  - receive the actual image file containing data representing the actual state of the portion of the graphical user interface,
  - receive the valid image file containing data representing the valid state intended for the portion of the graphical user interface;
  - compute a difference between the actual image file and the valid image file using the difference computing logic, the difference being based, at least in part, on a weighting function, the weighting function providing weights for parameters of the graphical user interface based on a relative importance of each parameter, wherein computing the difference between the actual image file and the valid image file includes removing one or more regions of the graphical user interface from consideration through use of the weighting function;
  - compare the difference between the actual image file and the valid image file to a threshold value using the comparison logic; and
  - determining whether the graphical user interface is valid based, at least in part, on whether the difference between the actual image file and the valid image exceeds the threshold value.

11. The apparatus of claim 10, wherein the actual image file and the valid image file are raster image files.

12. The apparatus of claim 10, wherein the removal of one or more regions of the graphical user interface from consideration in the computation of the difference between the actual image file and the valid image file through use of the weighting function is based, at least in part, on user input.

13. The apparatus of claim 12, wherein the user input regarding the one or more regions to be removed from consideration is to be received locally or remotely from a user as a file.

14. The apparatus of claim 12, further comprising a tool for receiving user input regarding regions that are to be removed from consideration.

15. The apparatus of claim 10, wherein the logic is further to:
- receive an input specifying a type for the graphical user interface; and
- alter a parameter of the weighting function based, at least in part, on the type for the graphical user interface.

16. An article of manufacture comprising:
- a computer-readable medium providing instructions that, when executed by a processor, cause the processor to:
  - receive a first image file containing data representing an actual state of at least a portion of the graphical user interface, the actual state including an actual visual appearance of the graphical user interface as it appears when the graphical user interface is presented on a computer display;
  - receive a second image file containing data representing a valid state that is intended for the portion of the graphical user interface, the valid state including a valid visual appearance for the portion of the graphical user interface;
  - compute a difference between the first image file containing data representing the actual state of the graphical user interface and the second image file containing data representing the valid state intended for the portion of the graphical user interface based, at least in part, on a weighting function, the weighting function providing weights for parameters of the graphical user interface based on a relative importance of each parameter, wherein computing the difference between the first image file and the second image file includes removing one or more regions of the graphical user interface from consideration through use of the weighting function;
  - compare the difference between the first image file and the second image file to a threshold value; and
  - determine whether the graphical user interface is valid based, at least in part, on whether the difference between the first image file and the second image file exceeds the threshold value.

17. The article of manufacture of claim 16, wherein the first image file and the second image file are raster image files.

18. The article of manufacture of claim 16, wherein the removal of one or more regions of the graphical user interface from consideration in the computation of the difference between the first image file and the second image file through use of the weighting function is based, at least in part, on user input.

19. The article of manufacture of claim 16, wherein the computer-readable medium provides further instructions that, when executed by the processor, cause the processor to:
- receive an input specifying a type for the graphical user interface; and
- alter a parameter of the weighting function based, at least in part, on the type.

* * * * *

UNITED STATES PATENT AND TRADEMARK OFFICE
CERTIFICATE OF CORRECTION

PATENT NO. : 7,644,368 B2  Page 1 of 1
APPLICATION NO. : 11/171973
DATED : January 5, 2010
INVENTOR(S) : Markus Pins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this

Twenty-first Day of December, 2010

David J. Kappos
*Director of the United States Patent and Trademark Office*